United States Patent [19]

Cook

[11] 4,247,178
[45] Jan. 27, 1981

[54] CLIP-ON SUNGLASSES

[76] Inventor: Joseph E. Cook, 1009 Westminster Dr., Greensboro, N.C. 27410

[21] Appl. No.: 34,339

[22] Filed: Apr. 30, 1979

[51] Int. Cl.³ .......................... G02C 9/00; G02C 7/08
[52] U.S. Cl. ........................................ 351/47; 351/58
[58] Field of Search ...................... 351/47, 48, 57, 58; 2/13, 442, 443

[56] References Cited

U.S. PATENT DOCUMENTS 3,413,057  11/1968  Carmichael ............................ 351/47

*Primary Examiner*—John K. Corbin
*Assistant Examiner*—Rodney Bovernick

[57] ABSTRACT

A snap-on construction for sunglasses of the type used with wire frame spectacles having a reinforcing wire or bar extending from the upper edge of one spectacle lens to the upper edge of the other lens. The sunglasses include a support frame member to which the pair of lenses are secured at least at an upper portion thereof and a pair of spaced posts extend rearwardly from the support frame. Each post includes a slot opening into the rear end thereof for receiving the reinforcing bar of the wire frames, and a locking bar selectively snaps into the slots behind the reinforcing bar to retain the sunglasses assembled on the spectacles.

5 Claims, 3 Drawing Figures

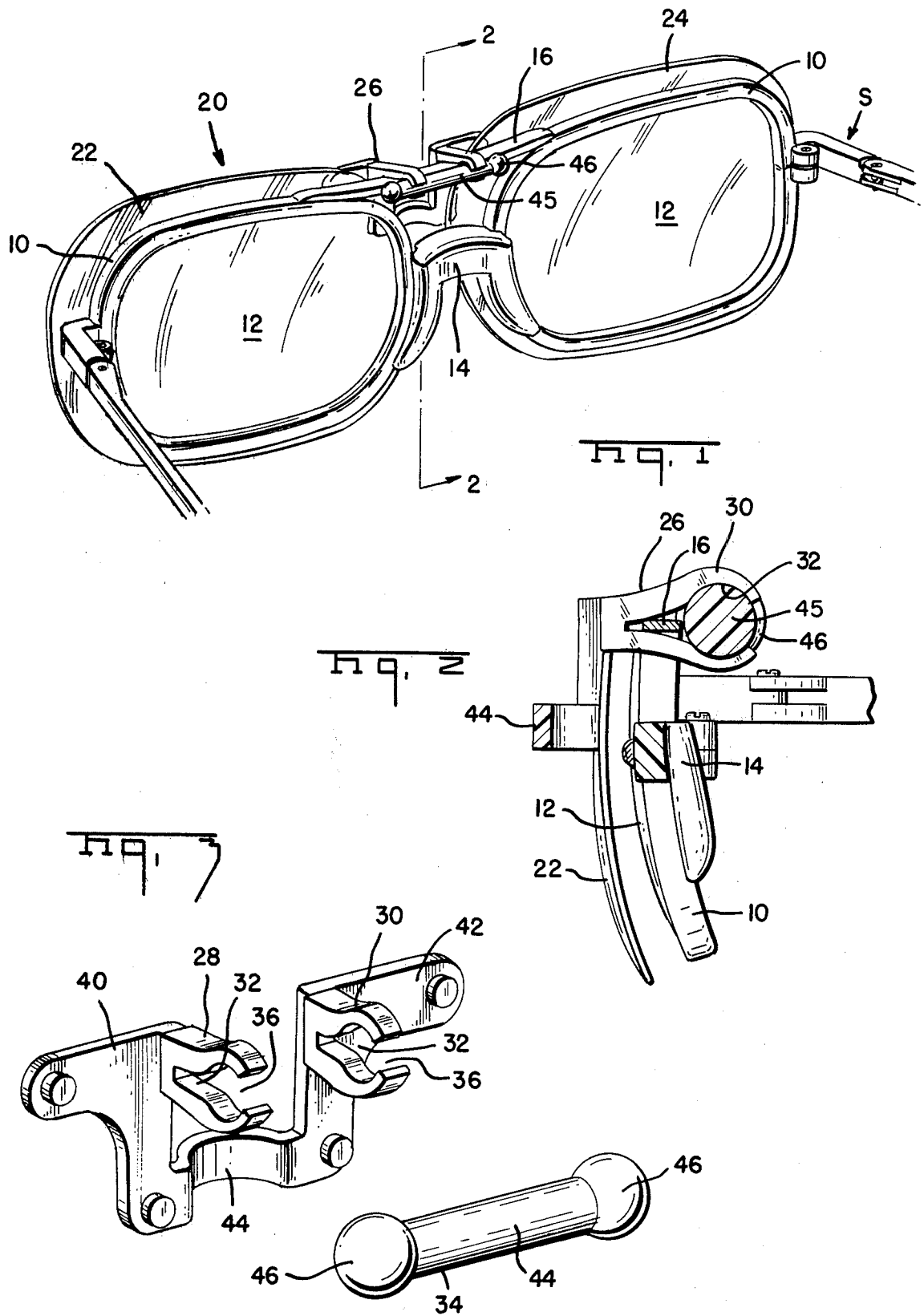

CLIP-ON SUNGLASSES

BACKGROUND OF THE INVENTION

Many attempts have been made to provide clip-on sunglasses for people wearing spectacles which obviates the necessity for carrying two pairs of glasses. While these clip-on sunglasses have been mildly successful, several problems have been noted. For one thing, most of these clip-on type sunglasses have a pair of spring fingers that extend downwardly and clip on to the rear side of the spectacle lenses for holding the sunglasses in place. Examples of such types of retaining means are shown in the U.S. Pat. to Loughner No. 3,876,295 and to Lindblom No. 3,010,364. It is very difficult to fabricate such clip-on sunglasses that fit a wide variety of spectacles with the result that many are loose and tend to joggle or not be tightly held thereon. Also, some of such clip-on sunglasses include sight impeding clips or the like which extend over the surface of the spectacle lens.

An even more prevalent problem existing with more contemporary spectacles is that the types of clip-on sunglasses previously designed for the plastic or horn-rim type glasses either do not fit or now fit so loosely as to be completely unacceptacle. By contemporary spectacles in this application, what is meant is the wire frame type spectacles which are returning to popularity. Substantially all of this type of spectacle includes a reinforcing wire or bar which extends from the upper edge of one spectacle lens to the upper edge of the other spectacle lens. This bar makes it very difficult for conventional or available clip-on sunglasses to be satisfactorily used. It is with this type of spectacle that the present invention is concerned.

SUMMARY OF THE PRESENT INVENTION

The present invention, therefore, is directed to a construction for clip-on sunglasses for use on spectacles of the type described hereinabove, which construction includes a frame member and a pair of lenses with at least the upper portion of each lens being secured to the frame member. An attachment means extends rearwardly from the frame members and includes a pair of spaced posts with a slot opening into the rear end of each of said posts for receiving said reinforcing bar of the spectacle frame therein. A separate locking bar is selectively placed in the slots behind the reinforcing bar of the spectacles, when assembled, to retain the sunglasses assembled onto the spectacles.

The slot in the rear end of each post includes two portions, a forwardly converging or tapered front portion for receiving the reinforcing bars of spectacle frames of varying sizes, and an enlarged, substantially arcuate rear portion for receiving the aforementioned, locking bar therein. Additionally, the locking bar is included with securing means at the end portions thereof to ensure a relatively tight fit between the sunglasses and spectacle frames. Such securing means may take the form of a bulbous portion at the end thereof for pressing against the frame of the spectacle when assembled or the locking bar may be fabricated in different lengths, such that it engages the frame of the spectacle in the assembled position.

It is therefore an object of the present invention to provide clip-on sunglasses peculiarly adapted to mount on contemporary wire frame spectacles.

It is another object of the present invention to provide clip-on sunglasses of the type described in which a pair of rearwardly extending post members include slots therein for receiving the reinforcing bar of contemporary wire frame glasses, and a locking bar is snapped in behind the reinforcing bar to lock the sunglasses and spectacles in the assembled position.

Other objects and a fuller understanding of the invention will become apparent from reading the following detailed description of a preferred embodiment along with the accompanying drawings in which:

FIG. 1 is a perspective view illustrating the clip-on sunglasses of the type described positioned on a pair of contemporary spectacles of the type contemplated by the present invention;

FIG. 2 is a sectional view taken substantially along lines 2—2 in FIG. 1; and

FIG. 3 is an enlarged perspective view of the frame or bridge portion of the clip-on glasses, illustrating the manner in which the locking bar snaps into the frame or bridge portion.

DETAILED DESCRIPTION OF A PREFERRED EMBODIMENT

Turning now to the drawings, and particularly to FIGS. 1 and 2, there is illustrated a pair of spectacles S of the type contemplated by the present invention. In order to understand the impact of the present invention on the industry, it is first of all necessary to describe the type of spectacles with which the present invention is adapted. First of all, a wire frame 10 receives a pair of lenses 12, said frame 10 and lenses 12 including a bridging portion 14 connecting the two. In order to reinforce or make the spectacles S more rigid or sturdy, a reinforcing wire or bar 16 extends from the upper frame portion of one lens across to the corresponding upper portion or edge of the other upper frame portion. So arranged, earlier problems in wire spectacles involving the considerable stress put on the bridge portion of the glasses are now eliminated, and the glasses are considerably sturdier than those known years ago. However, this construction has also created difficulty as far as utilizing conventional clip-on sunglasses of the type described in the aforementioned Lindblom and Loughner patents, which clip-on sunglasses were constructed mainly for use with the plastic or horn-rim glasses popular several years ago. Such types of clip-on sunglasses do not fit well, are very loose and do not cover the spectacle lenses in the proper manner when used with the more contemporary wire frame spectacles becoming increasingly popular today.

The solution to this problem is achieved in the present invention by utilizing the reinforcing bar 16 as the sole or at least primary point of attachment for the clip-on sunglasses 10. In the preferred embodiment, the clip-on sunglasses 20 include a pair of lenses 22, 24 and a frame or bridge member 26, which will be discussed in more detail hereinafter. For the time being, however, it is sufficient to mention that the lenses 22, 24 are riveted or otherwise secured to the bridge or frame member 26, which frame member also includes an attachment means extending rearwardly therefrom. The attachment means is in the form of a pair of spaced posts 28, 30 each of which includes a slot 32 opening into the rear end thereof, into which slots 32 the reinforcing bar 16 of the spectacles S is received (see FIG. 2). A locking bar 34 is then removably received within a rear portion 36 of the slot to retain the sunglasses in the assembled position on the spectacles.

Turning now to FIG. 3, there is an enlarged showing of the frame or bridge member 26 which includes a pair of L-shaped lens receiving portions or plates 40,42 to which the lenses are riveted or otherwise fastened. The L-shaped retaining plates 40,42 are connected to each other by a bridging member 44. The aforementioned posts or arms 28,30 extend rearwardly from the upper inner corner of plates 40,42, and are bifurcated to form the slots 32. The shape of the slots 32 in the posts 28,30 are important as far as adapting the clip-on sunglasses to a large number of spectacles. Toward this objective the forward portion of the slots 32 are tapered to converge toward the front of the posts, thereby providing for the reception of reinforcing bars 16 of various sizes (see FIG. 2). The rear portion of the walls forming the slot 32 include arcuate recesses 36 which receive the locking bar 34.

Looking at FIG. 3 locking bar 34 includes an elongated central portion 45. In order that the locking bars ensure a relatively tight fit between the sunglasses and spectacles regardless of the size of the reinforcing bar 16 of the spectacles, or regardless of the shape of the frame. One way to provide and ensure a tight, snug fit is to provide bulbous portions 46 at the ends of the central portion 45. It should be noted that the bulbous portions should be spaced apart a distance at least as great as the distance between the arms 28,30, so that in the assembled position the bulbous portions fall on either side of the outside portions of the arms 28,30. By making the bulbous portions 46 of different diameters on different locking bars, a person may select the proper locking bar which will ensure a snug fit on his particular spectacles, it being realized that the bulbous portions may be of different diameters. Another way to ensure a relatively tight fit is to make the locking bars 34 of varying lengths. Then a person merely selects a locking bar that is sufficiently long to engage the frame portion of his glasses at points spaced from the arms 28,30 so that a tight, snug fit is ensured.

So arranged, the clip-on sunglasses according to the present invention overcome the problems described hereinabove. Attachment to the spectacles is made only or at least primarily in the area of the reinforcing bar 16, so that there are no depending fingers or spring-loaded type clips that attach to the lens surface which might scratch the lens or impair the line of sight. Also, the attachment means for the present invention is provided with some degree of adjustability as far as the size of the spectacle reinforcing bars 16 which may be snuggly retained therein. The clip-on sunglasses of the present invention are specifically adapted for the more contemporary wire-frame glasses. It should be further noted that the attachment means of the present invention provides a very simple inexpensive technique or system for clipping on sunglasses to wire-frame spectacles in addition to providing all of the benefits and overcoming the problems set forth hereinabove.

Although a preferred embodiment of the present invention has been described in detail hereinabove, it should be recognized that possible changes and modifications are possible to the precise embodiment shown and described without departing from the scope of the invention which is set forth by the claims below.

What is claimed is:

1. Clip-on sunglasses for use on spectacles of the type including wire frames and a reinforcing wire or bar extending from the upper edge of one spectacle lens to the upper edge of the other spectacle lens, said sunglasses comprising:
    (a) a frame member and a pair of lenses, at least an upper portion of each of said lenses being secured to said frame member;
    (b) an attachment means extending rearwardly from said frame member and including
        (i) a pair of spaced posts, a slot opening into the rear end of each of said posts for receiving said spectacle reinforcing bar;
        (ii) a locking bar removably received in said slots behind said spectacle reinforcing bar, said locking bar being of such size with relationship to said slots as to be held snugly therein to retain said sunglasses and sunglasses in the assembled condition.

2. Clip-on sunglasses according to claim 1 wherein the walls forming said slot in said posts includes a forwardly conveying front portion and an enlarged, substantially arcuate rear portion, wherein spectacle frames having reinforcing bars of varying sizes may be accommodated.

3. Clip-on sunglasses according to claim 1 wherein said locking bar is provided with securing means to ensure a relatively tight fit between the sunglasses and spectacles.

4. Clip-on sunglasses according to claim 3 wherein said securing means includes bulbous portions at the ends of said locking bar for pressing against the frame portion of said spectacles when assembled.

5. Clip-on sunglasses according to claim 3 wherein the length of said locking bar is such that it engages the frame portion of said spectacles in the assembled position.

* * * * *